(12) United States Patent
Austin et al.

(10) Patent No.: US 6,393,270 B1
(45) Date of Patent: May 21, 2002

(54) NETWORK AUTHENTICATION METHOD FOR OVER THE AIR ACTIVATION

(75) Inventors: Mark D. Austin, Atlanta; Stephen T. Hardin, Snellville, both of GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 08/950,389

(22) Filed: Oct. 14, 1997

Related U.S. Application Data (60) Provisional application No. 60/027,708, filed on Oct. 11, 1996.

(51) Int. Cl.[7] ................................................ H04M 1/66

(52) U.S. Cl. ........................ 455/411; 455/410; 380/247

(58) Field of Search ........................... 455/411, 410, 455/419, 418, 551, 435, 432, 552, 414, 550; 380/23, 21, 25, 247, 249, 44; 340/825.34

(56) References Cited

U.S. PATENT DOCUMENTS

| | | | |
|---|---|---|---|
| 4,099,033 A | 7/1978 | Murray | ......................... 179/90 |
| 4,291,197 A | 9/1981 | Yonaga | ......................... 179/2 |

(List continued on next page.)

FOREIGN PATENT DOCUMENTS

| | | | | |
|---|---|---|---|---|
| DE | 92 17 379.9 | 4/1993 | ............ | H04L/12/16 |
| EP | 0 532 227 A2 | 3/1993 | ............. | H04L/9/32 |
| EP | 0 652 681 A2 | 5/1995 | ............. | H04Q/7/32 |
| EP | 0 675 615 A1 | 10/1995 | ............. | H04L/9/32 |
| WO | WO 97/22221 | 6/1997 | ............. | H04Q/7/32 |

OTHER PUBLICATIONS

Cromwell, Robert "Privacy and Authentication for Digital RF Links", *RF Cryptography*, Sep. 1998, pp. 22–30.
Rivest, R. "The MD5 Message–Digest Algorithm." *Internet RFC 1321.* Apr. 1992.

(List continued on next page.)

*Primary Examiner*—William Trost
*Assistant Examiner*—Congvan Tran
(74) *Attorney, Agent, or Firm*—Nora Tocups; Kilpatrick Stockton (57) ABSTRACT

A method for authenticating a cellular service provider during over the air activation of a mobile station includes the steps of programming an A-key value into the mobile station and providing the A-key value to the service provider. The mobile station requests over the air activation by transmitting a registration request to the service provider. The service provider verifies billing information and generates two random numbers. The service provider then performs a first CAVE algorithm using the provided A-key value and the first random number to generate a first shared secret data value. The service provider performs a second CAVE algorithm using the first shared secret data value and the second random number to produce a first authentication value. The service provider then transmits the first and second random numbers along with the authentication value to the mobile station. The mobile station performs a third CAVE algorithm using the first random number and its programmed A-key value to generate a second shared secret data value. Next, the mobile station performs a fourth CAVE algorithm using the second random number and the second shared secret data value to generate a second authentication value. The mobile station then compares the first and the second authentication value to determine if the correct service provider is activating the mobile station.

27 Claims, 10 Drawing Sheets

U.S. PATENT DOCUMENTS

| | | | |
|---|---|---|---|
| 4,453,042 A | 6/1984 | Wolf et al. ................... | 179/84 |
| 4,532,507 A | 7/1985 | Edson et al. ........... | 340/825.31 |
| 4,593,155 A | 6/1986 | Hawkins ........................ | 179/2 |
| 4,724,537 A | 2/1988 | Monet ......................... | 379/58 |
| 4,736,419 A | 4/1988 | Roe .............................. | 380/3 |
| 4,908,848 A | 3/1990 | Hanawa ....................... | 379/63 |
| 4,945,556 A | 7/1990 | Namekawa .................. | 379/58 |
| 5,068,889 A | 11/1991 | Yamashita ................... | 379/62 |
| 5,159,625 A | 10/1992 | Zicker ......................... | 379/59 |
| 5,276,729 A | 1/1994 | Higuchi et al. .............. | 379/58 |
| 5,297,192 A | 3/1994 | Gerszberg .................... | 379/59 |
| 5,341,426 A * | 8/1994 | Barney et al. ................ | 380/21 |
| 5,373,289 A | 12/1994 | Ichinohe ............... | 340/825.56 |
| 5,386,468 A | 1/1995 | Akiyama et al. ............. | 380/25 |
| 5,390,252 A * | 2/1995 | Suzuki et al. ................ | 380/23 |
| 5,457,737 A | 10/1995 | Wen ............................ | 379/62 |
| 5,467,398 A * | 11/1995 | Pierce et al. ................. | 380/44 |
| 5,481,610 A | 1/1996 | Doiron et al. ................ | 380/21 |
| 5,513,245 A * | 4/1996 | Mizikovsky et al. ......... | 379/59 |
| 5,594,778 A | 1/1997 | Schaupp, Jr. et al. ........ | 379/58 |
| 5,600,708 A | 2/1997 | Meche et al. ................ | 379/58 |
| 5,603,084 A | 2/1997 | Henry, Jr. et al. ............ | 455/33 |
| 5,613,012 A | 3/1997 | Hoffman et al. ............ | 382/115 |
| 5,646,604 A | 7/1997 | Maruyama et al. .... | 340/825.31 |
| 5,673,317 A | 9/1997 | Cooper ........................ | 380/23 |
| 5,742,669 A | 4/1998 | Lim ........................... | 379/130 |
| 5,749,052 A | 5/1998 | Hidem et al. ............... | 455/406 |
| 5,784,464 A * | 7/1998 | Akiyama et al. ............. | 380/25 |
| 5,793,866 A * | 8/1998 | Brown et al. ................. | 380/2 |
| 5,794,139 A * | 8/1998 | Mizikovsky et al. ....... | 455/403 |
| 5,835,858 A * | 11/1998 | Vaihoja et al. .............. | 455/419 |
| 5,850,445 A * | 12/1998 | Chan et al. ................... | 380/23 |
| 5,864,757 A | 1/1999 | Parker ........................ | 455/418 |
| 5,875,394 A * | 2/1999 | Daly et al. ................... | 455/411 |
| 5,887,251 A * | 3/1999 | Fehnel ........................ | 455/411 |
| 5,930,362 A * | 7/1999 | Daly et al. .................... | 380/21 |
| 5,970,144 A * | 10/1999 | Chan et al. ................... | 380/23 |
| 5,991,407 A * | 11/1999 | Murto ......................... | 380/23 |
| 6,125,273 A | 9/2000 | Yamagishi .................. | 455/411 |
| 6,130,622 A * | 10/2000 | Hussey et al. ......... | 340/825.31 |
| 6,157,826 A * | 12/2000 | Lee ............................. | 455/411 |
| 6,199,161 B1 * | 3/2001 | Ahvenainen ................ | 713/155 |

OTHER PUBLICATIONS

TIA IS–54 Appendix A "Dual–mode Cellular System: Authentication, Message Encryption, Voice Privacy Mask Generation, Shared Secret Data Generation, A–Key Verification, and Test Data" Feb. 1992.

The GSM System for Mobile Communications, European Telecommunication Standard, "European digital cellular telecommunications system (Phase 2); Technical realization of the Short Message Service (SMS) Point to Point (PPP) (GSM 03.40)," pp. 1–103 (Oct. 1993) and "European digital cellular telecommunications system (Phase 2); Technical realization of Short Message Service Cell Broadcast (SMSCB) (GSM 03.41)," pp. 1–24 (Oct. 1993), Authors and Publishers—M. Mouly and Marie–B.Pautet, France.

IS–1366 Revision A (Telecommunications Industry Association), Jun. 1996.

Cellular–Phone Coverage Expands to 35 Countries, *The Wall Street Journal*, p. B9 (Nov. 8, 1995).

Brochure entitled "PCS 1900: Tomorrow's Technology—Today," *The North American PCS 1900 Action Group (NPAG)*.

* cited by examiner

NETWORK AUTHENTICATION METHOD FOR OVER THE AIR ACTIVATION

This application is a provisional of No. 60/027,708 filed Oct. 11, 1996

BACKGROUND OF THE INVENTION

1. Field of the Invention

The present invention is related to cellular mobile station activation and, more particularly to a method for authenticating a service provider during over the air activation.

2. Background

Over the air activation ("OTAA") was proposed in IS-136 Revision A (Telecommunications Industry Association), June 1996 and the Addendums thereto, which are incorporated by reference herein. OTAA enables a cellular service provider to activate a potential subscriber's cellular mobile station over the air. The service provider downloads certain parameters, such as the telephone number, to the unit over the air. This service is extremely convenient for consumers who are no longer required to bring the unit into a dealer or service agent for activation. Moreover, OTAA allows service providers to market cellular telephone units through non-traditional mass-market retailers, who do not have the personnel to program subscriber telephone units.

Due to the push to implement OTAA early, certain implementation aspects were not included in IS-136 Revision A. For instance, the OTAA proposal failed to include adequate provisions for network authentication—a method for preventing fraudulent access to the cellular telephone system by validating cellular users. Network authentication ensures that the correct service provider is the only entity that can program the cellular telephone unit. The initial OTAA disclosure does not incorporate current non-over-the-air methods for network authentication, such as A-key authentication.

A-key authentication is a North American network authentication process. During setup, each cellular telephone is issued a number called an A-key. The A-key is issued much as Swiss banks issue a secret account number to identify secretive clients. This A-key value is never disclosed to others. The subscriber enters it into the cellular telephone via the keypad. The telephone uses the A-key to calculate and store a shared secret data ("SSD") key. The network also performs the same calculations to create and store the SSD. During each call, the SSD key creates an authentication response code, and during access, the phone transmits only the authentication response code. The authentication response changes during each call because the system sends a random number which is also used to create the authentication response code value. A criminal who intercepts an authentication transaction over the air has no clue regarding the correct value of the SSD key, and cannot repeat the response given in one authentication transaction to try to fool the system in another authentication transaction.

The initial OTAA proposal does, however, provide for the use of a "subsidy lock." A subsidy lock is a method for securing the preprogramming of a service provider-subsidized cellular telephone unit. Service providers often condition the use of a subsidized cellular telephone unit by conditioning the use of the unit on its being "unlocked" only for that service. Several methods for locking and unlocking handsets are described in U.S. patent application Ser. No. 08/570,921, filed Dec. 12, 1995 for "Methods and Apparatus For Locking Communications Devices" to John Patrick Parker and assigned to BellSouth Corporation, which is hereby incorporated by reference herein. Unfortunately, the subsidy lock proposed in IS-136 Revision A fails to take advantage of A-key information.

An improved mechanism for OTAA should include support for network authentication. Preferably, network authentication in OTAA involves the use of A-key programmed information. Furthermore, the network authentication should provide a method for securing the programming of a service provider-subsidized cellular telephone unit.

SUMMARY OF THE INVENTION

The present invention overcomes the problems of the prior art by providing a method for authenticating service providers during over the air activation of a mobile station. The present invention utilizes an A-key pre-programmed into the mobile station. The A-key is also provided to the service provider. The service provider performs an algorithm using the provided A-key and transmits the results along with the algorithm input parameters to the mobile station. The mobile station, during over the air activation, performs the same algorithms using the provided parameters and the programmed A-key. If the results are the same, then the mobile station has authenticated the service provider.

In a preferred embodiment of the present invention, a method for authenticating a cellular service provider during over the air activation of a mobile station includes the steps of: (1) programming an A-key value into the mobile station; (2) providing the A-key value to the service provider; (3) generating a first authentication value at the service provider using the provided A-key value; (4) transmitting the first authentication value to the mobile station; (5) generating a second authentication value at the mobile station using the programmed A-key value; and (6) comparing the first and second authentication values.

The first authentication value is generated by performing two algorithms. First, the service provider generates two random numbers. The service provider performs a first CAVE algorithm using the first random number and the provided A-key value. The first CAVE algorithm produces a first shared secret data value. The service provider then performs a second CAVE algorithm using the first shared secret data value and the second random number. The second CAVE algorithm produces a first authentication value. The service provider then transmits the first and second random numbers and the authentication value to the mobile station. The mobile station performs a third CAVE algorithm using the first random number and the programmed A-key value. The third CAVE algorithm produces a second shared secret data value. The mobile station performs a fourth CAVE algorithm using the second shared secret data value and the second random number. The fourth CAVE algorithm produces a second authentication value. The mobile station compares the first and second authentication values. If the numbers are identical, the service provider has been authenticated.

The present invention may be used as a subsidy lock. The A-key value is known only by the service provider. Thus, mobile phones made by the service provider may include the pre-programmed A-key value. The same authentication process may be used, therefore, to verify that the service provider is the manufacturer.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

DETAILED DESCRIPTION OF THE PREFERRED EMBODIMENT

Reference will now be made in detail to a preferred embodiment of the invention, examples of which are illustrated in the accompanying drawings. Wherever possible, the same reference numbers will be used throughout the drawings to refer to the same or like parts.

Figure 1:
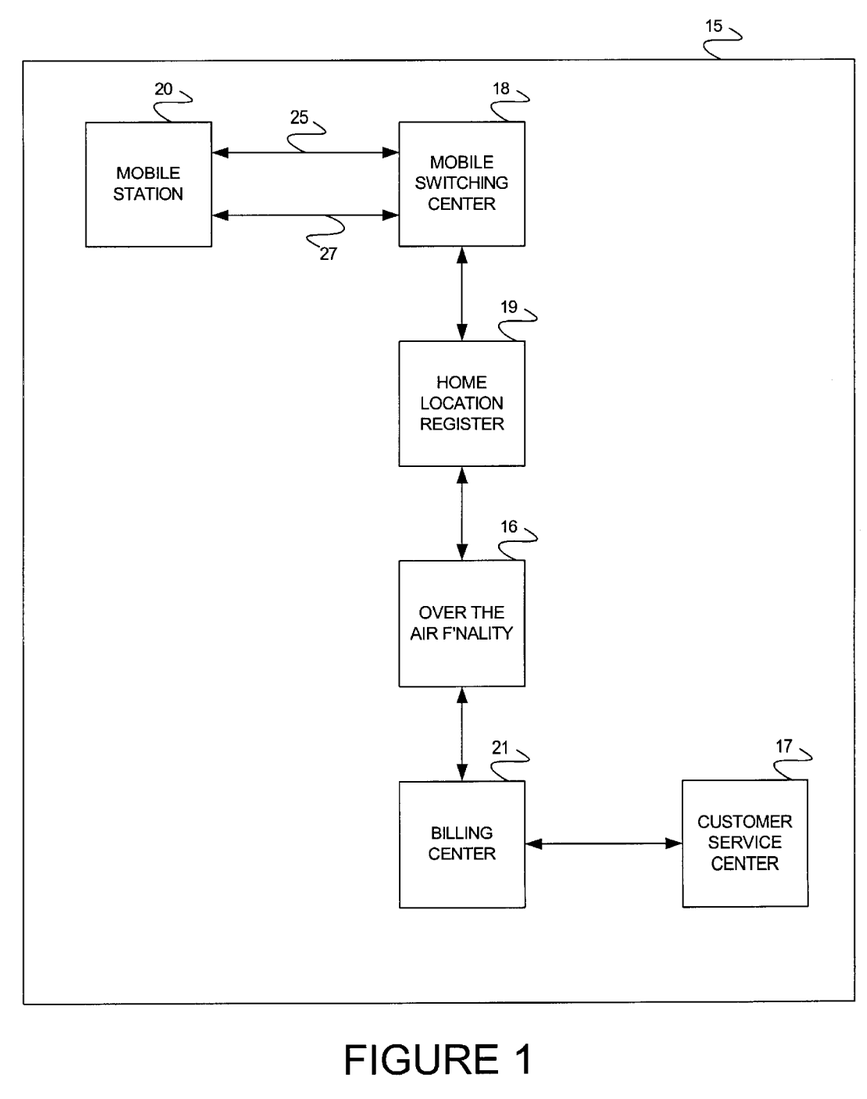
FIG. 1 is a block diagram of a cellular telephone network, in accordance with a preferred embodiment of the present invention.

FIG. 1 is a block diagram of a cellular telephone network 15, in accordance with a preferred embodiment of the present invention. The network 15 includes a cellular mobile station 20, such as a hand-held cellular telephone, owned by a cellular subscriber. The subscriber seeks cellular telephone activation from a cellular service provider who offers over the air activation ("OTAA") to its customers. The service provider offers OTAA through over the air activation functionality (OTAF") 16 present in the network 15. For instance, the OTAF 16 may be offered through a private switch controlled by the service provider. The service provider monitors activation through its customer service center ("CSC") 17. The CSC stores activation information in its billing center ("BC") 21. It should be apparent to those of ordinary skill in the art that network 15 may include additional components, such as base stations and other communication devices that were omitted for the sake of clarity.

The mobile station 20 communicates with the CSC via a Mobile Switching Center ("MSC") 18. The MSC 18 coordinates the overall allocation and routing of calls throughout the cellular network 15. The MSC 18 tracks customers using a subscriber database termed a "Home Location Register" (HLR") 19. Mobile station 20 and MSC 18 communicate over a digital control channel ("DCCH") 25 and a voice channel 27. DCCH 25 carries digital messages and signals that allow the mobile station to retrieve system control information and compete for access. In the present invention, DCCH 25 carries messages necessary for activation of cellular telephone unit 20. Voice channel 27 is primarily used to transfer voice information, but may also send and receive some digital control messages.

Figure 2:
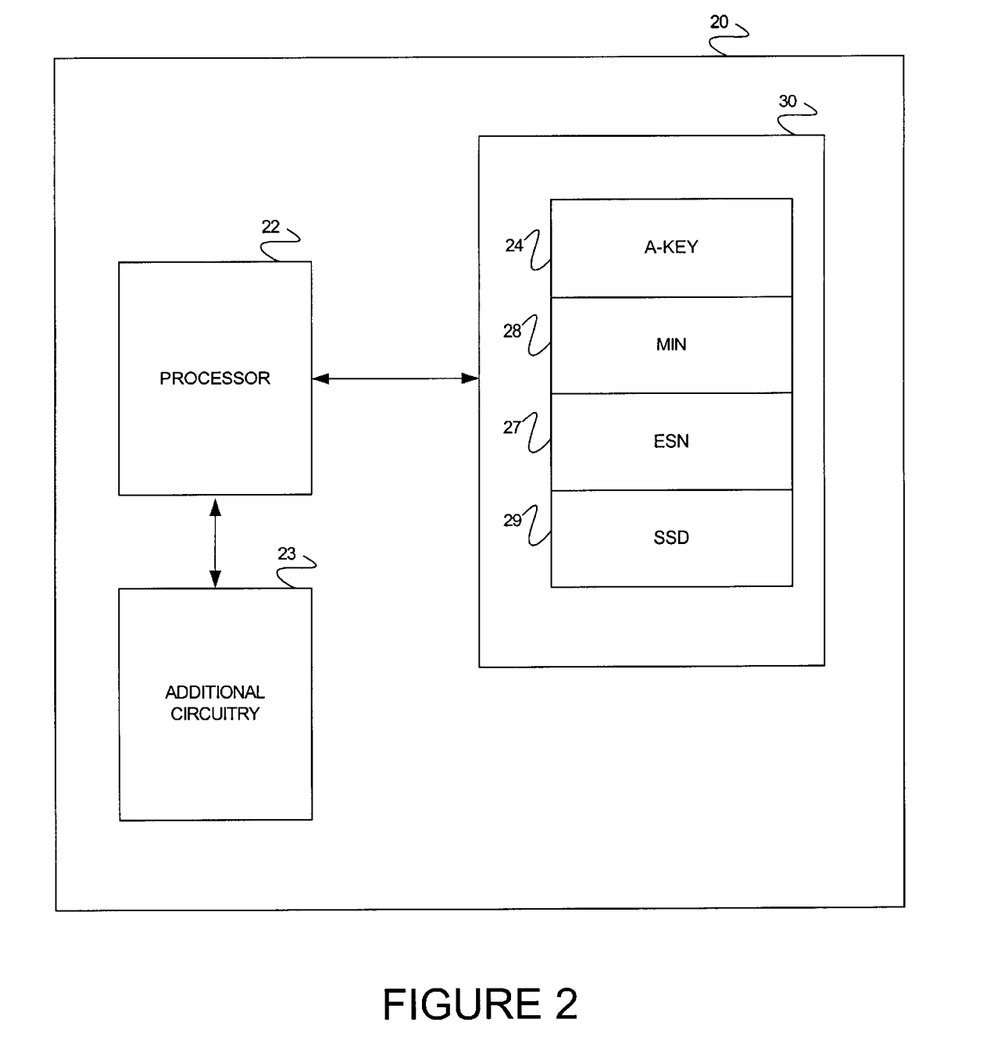
FIG. 2 is a block diagram of a cellular mobile station, in accordance with a preferred embodiment of the present invention.

FIG. 2 is a block diagram of mobile station 20, in accordance with a preferred embodiment of the present invention. Mobile station 20 includes processor 22 capable of processing messages received by mobile station 20 using known hardware and according to known methods. At the time of manufacture, a memory device in 30 in mobile station 20 is pre-programmed with and an authentication key ("A-key") 24. The A-key 24, which is to be used in the computation of a shared secret data ("SSD") key 29, is a predetermined value assigned to a cellular mobile station having a particular Electronic Serial Number ("ESN") 27. Although not necessarily unique in a strict sense, it should not be shared by any defined group of handsets. If this condition is met, it should not be possible to deduce the A-key from the ESN 27 or from the A-keys of other devices having such keys. Only the service provider should know the A-key 24 for a particular handset. The service provider will use the A-key for network authentication during the OTAA process. The telephone memory further includes a Mobile Identification Number ("MIN") field 28. The MIN is usually the telephone number of the mobile station 20. The MIN field is not populated until the activation procedure begins. It should be apparent to one of ordinary skill in the art that mobile station 20 may include additional circuitry 23.

Activation of mobile station 20 begins with the mobile station 20 identifying itself to the network 15. Mobile station 20 may be previously unactivated with no prior service provider or previously activated but the user has allowed its subscription with its prior service provider to lapse. If the mobile station 20 is previously unactivated, it may identify itself to the network using a registration procedure or an origination procedure.

Figure 3:
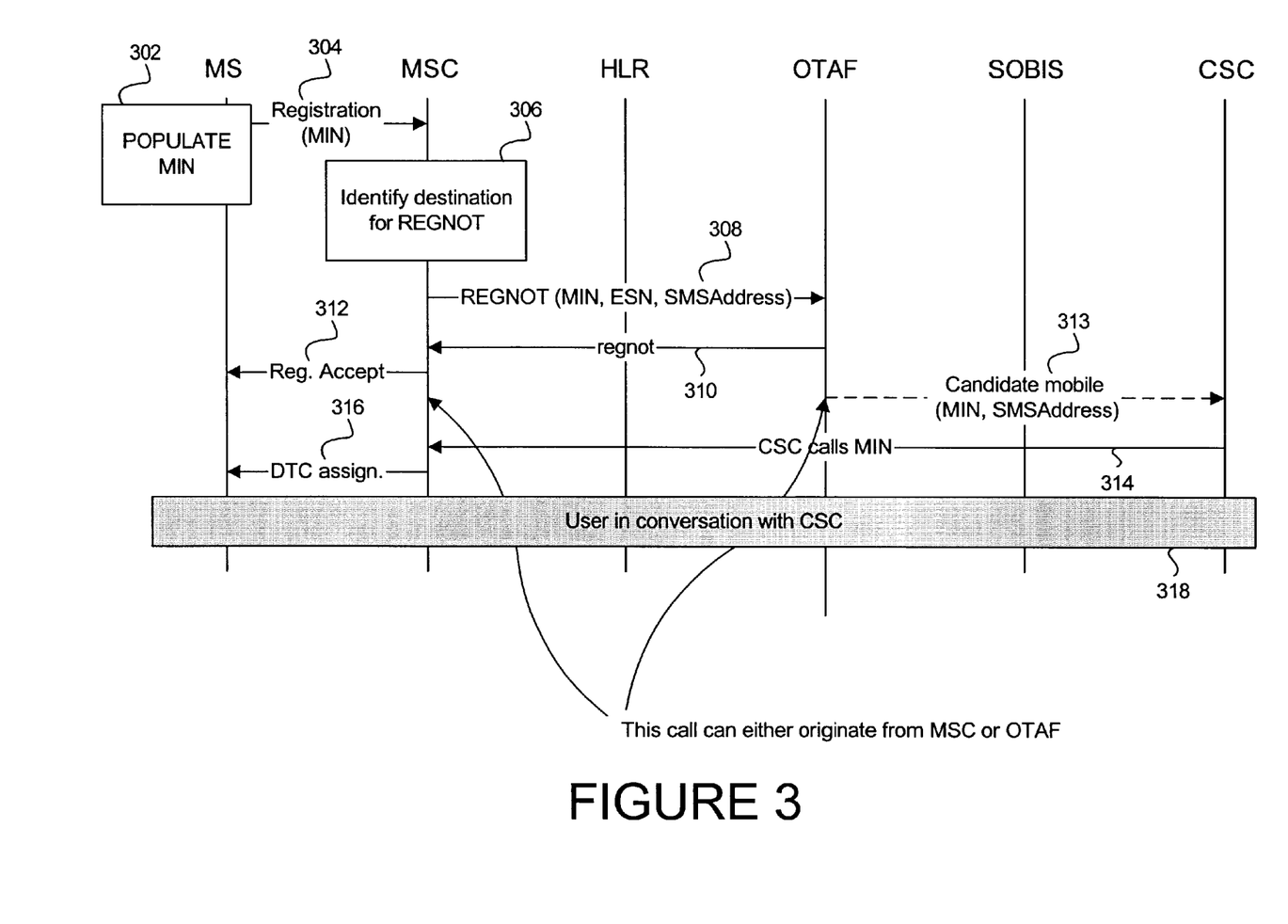
FIG. 3 is a call flow diagram illustrating the flow of information between network components during the registration procedure.

FIG. 3 is a call flow diagram illustrating the flow of information between network components during the registration procedure. In step 302, the mobile station 20 populates the MIN field 28. As is known in the art, the MIN is divided into MIN1 and MIN2. MIN1 is the seven-digit portion of the number (NXX-XXXX). MIN2 is the three-digit area code portion of the number (NPA). In the present invention, the mobile station 20 sets the NPA to "000". This is equivalent to setting the ten most significant bits of the MIN2 field to 1111100111 (binary). The mobile station 20 sets the 24 least significant bits of MIN1 by converting the 32-bit ESN to a decimal number (e.g., FFFF FFFF in hexadecimal format is equal to 4294967295 in decimal format) and converting the seven least significant digits of the now decimal-formatted ESN (e.g., 4967295) into a 24-bit binary string as described in Section 2.3.1 of IS-136.2 relating to MIN1 algorithm conversion. The mobile station 20 may now be dialed using the populated MIN. In step 304, mobile station 20 transmits the populated MIN to MSC 18.

The MSC 18 recognizes the MIN as an unactivated mobile station. In step 306, the MSC 18 identifies a destination for sending a Registration Notification (RegNot). The Registration Notification includes the transmitted MIN, the ESN (derived using a backwards algorithm from the one described above), and a Short Message Service address (SMSAddress). The SMSAddress is a unique address that allows certain cellular telephones to decode and receive a text message. The MSC 18, in step 308, sends the Registration Notification to the OTAF 16. In step 310, the OTAF 16 stores the information and transmits a response to the MSC 18 that acknowledges receipt and storage of the transmitted information. Calls to the MIN are now switched through MSC 18. In step 312, MSC 18 (or OTAF 16) transmits a message to the mobile station 20 that registration of the mobile station 20 has been accepted. In addition OTAF 16 (or MSC 18) transmits the MIN and SMSAddress to CSC 17. CSC 17 uses the information for billing and subscription purposes. Next, in step 314, CSC 17 calls the MIN to confirm receipt of the information. The cellular call to the MIN is switched to MSC 18 that now handles calls to and from the MIN. MSC 18 then assigns a digital traffic channel ("DTC") to mobile station 20 in step 316. The user, in step 318, then communicates directly with the CSC 17 to provide billing information. If the user drops a call during the process, the user must reinitiate the registration process.

Figure 4:
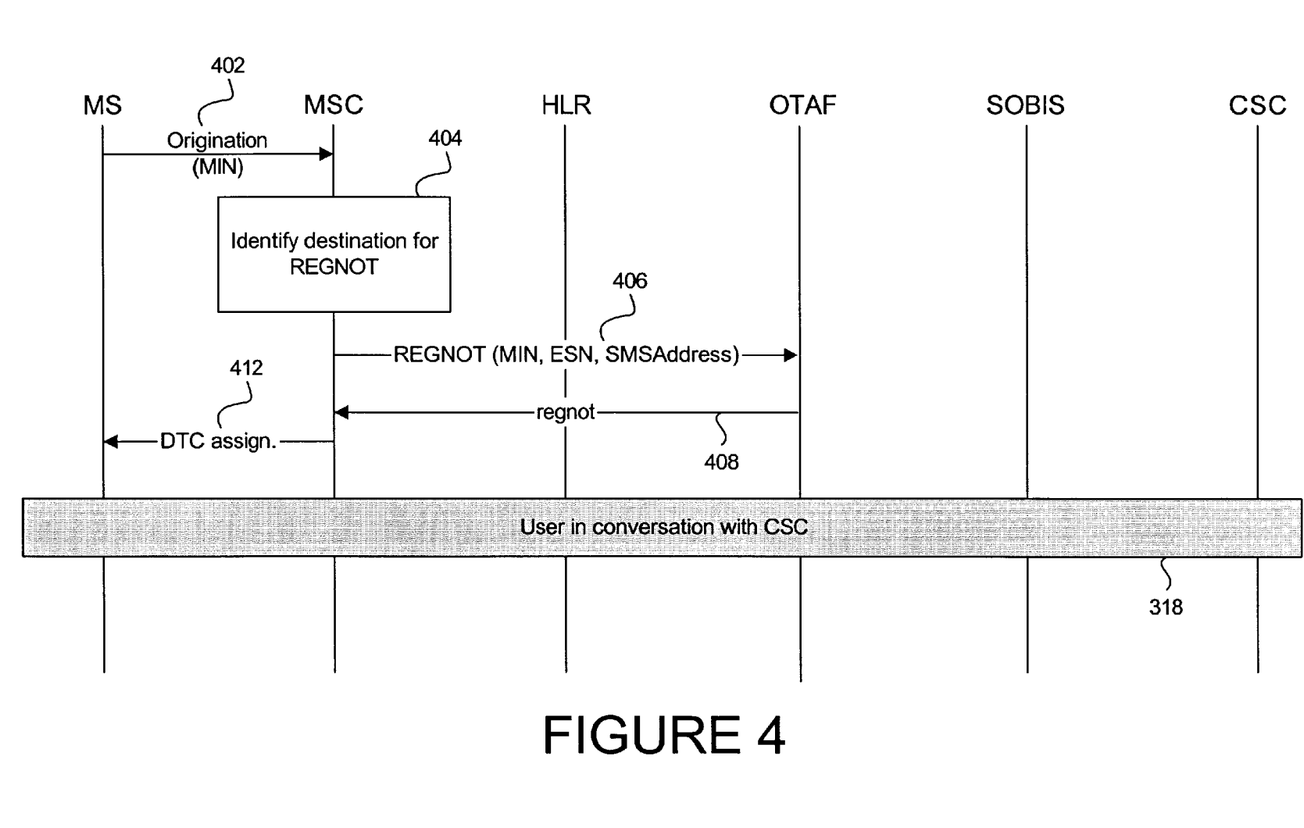
FIG. 4 is a call flow diagram illustrating the flow of information between network components during the origination procedure.

FIG. 4 is a call flow diagram illustrating the flow of information between network components during the origination procedure. The mobile station 20 populates the MIN as described above with respect to FIG. 3. In step 402, the mobile station 20 transmits the MIN to the MSC 18. The MSC 18 recognizes the MIN as an unactivated mobile station. In step 404, the MSC 18 identifies a destination for sending a RegNot. The MSC 18, in step 406, sends the Registration Notification to the OTAF 16. In step 408, the OTAF 16 stores the information and transmits a response to the MSC 18 that acknowledges receipt and storage of the transmitted information. Calls to the MIN are now switched through MSC 18. The MSC 18, in step 412 assigns a DTC to the mobile station 20. The user, in step 318, then communicates directly with the CSC 17 to provide billing information.

Figure 5:
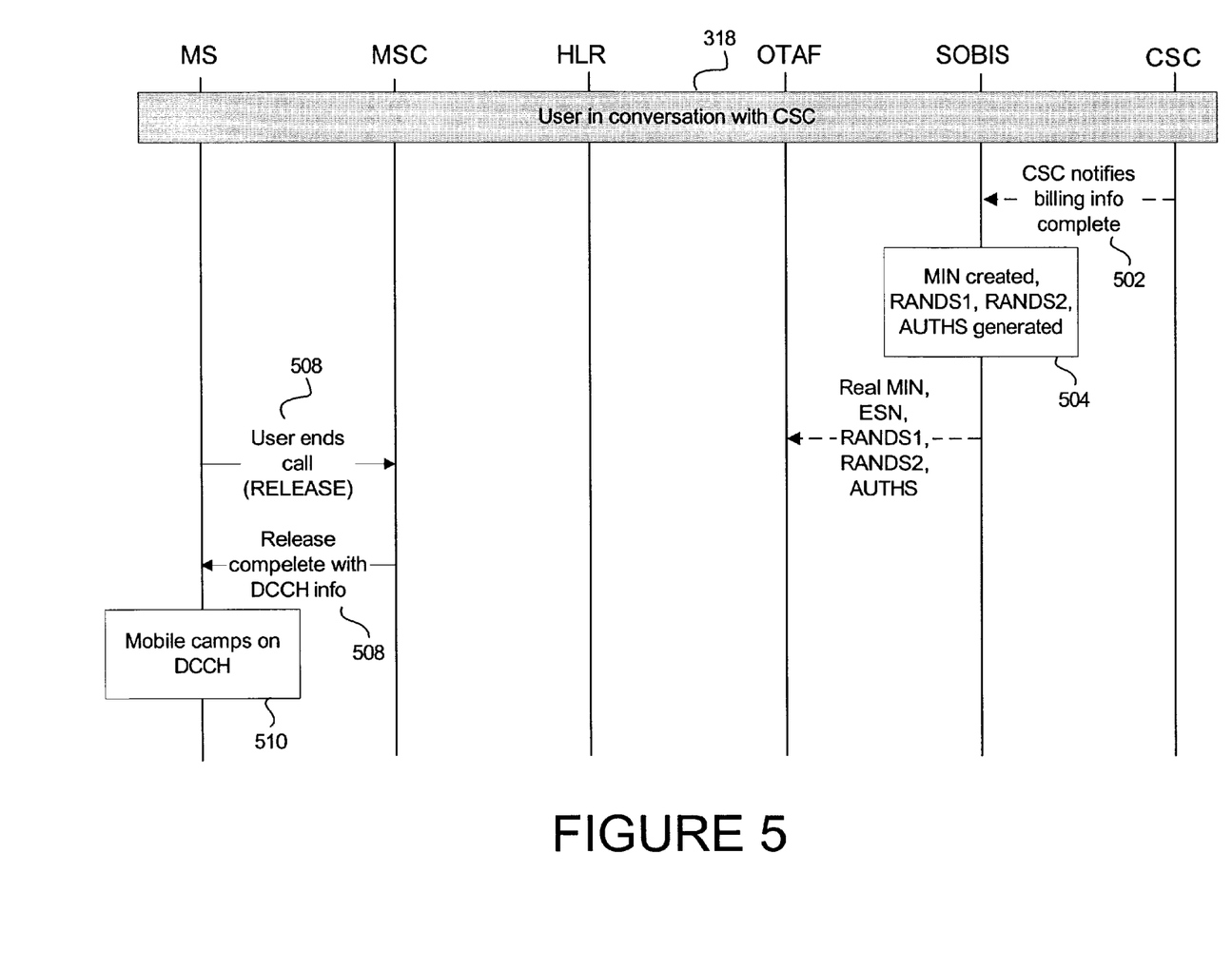
FIG. 5 is a call flow diagram illustrating the flow of information between network components following the conversation between the user and the customer service center.

FIG. 5 is a call flow diagram illustrating the flow of information between network components following the billing conversation between the user and the customer service center 17. In step 502, CSC 17 notifies billing center 21 that the billing information has been received. The CSC provides this billing information to the BC 21. The BC, in step 504, creates a new MIN for the subscriber. In addition, the BC generates two random numbers (RANDS1, RANDS2) and an authentication request number (AUTHS). The BC generates AUTHS using the Cellular Authentication Verification Algorithm ("CAVE"). In particular, the BC inputs RANDS1 into the CAVE algorithm along with the A-key of the cellular mobile station 20 to generate a shared secret data ("SSD") value. The service provider knows the A-key, as discussed above. Next, the BC inputs the SSD along with RANDS2 into the CAVE algorithm to generate AUTHS. In step 506, the BC transmits the new MIN, the ESN, RANDS1, RANDS2, and AUTHS to the OTAF for use in activation. The user ends the call in step 508, thereby sending a "release" signal to the MSC 18. The MSC 18 completes the release and provides DCCH information to the cellular mobile station 20 in step 508. In step 510, the user camps on the DCCH to await activation.

Figure 6:
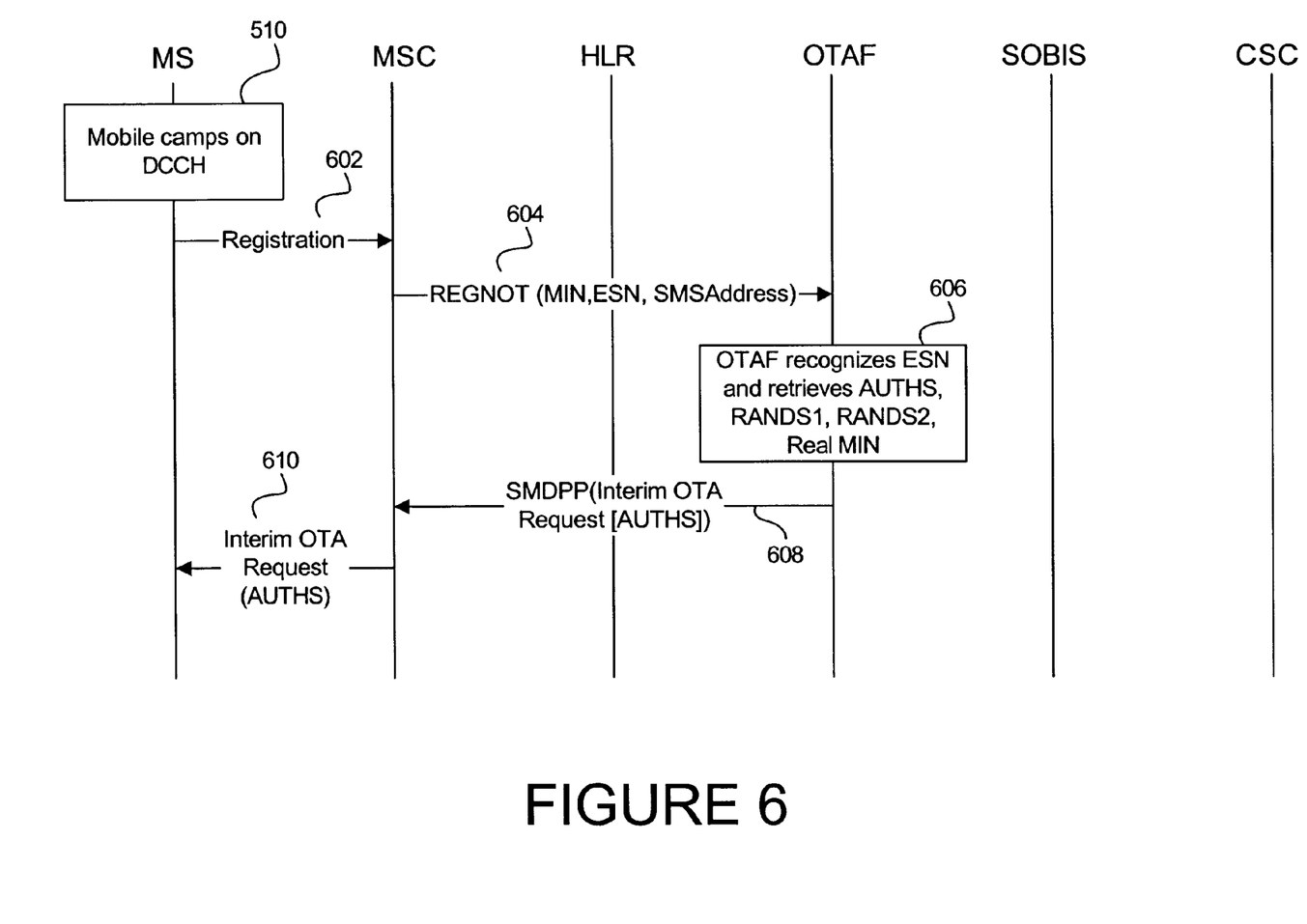
FIG. 6 is a call flow diagram illustrating the flow of information between network components during the beginning of the Number Assignment Module download

FIG. 6 is a call flow diagram illustrating the flow of information between network components during the beginning of the Number Assignment Module ("NAM") download. In step 602, the mobile station 20 sends a second registration request to MSC 18. Upon receipt of the registration, MSC 18 recognizes the unactivated MIN. Accordingly, in step 604, MSC 18 forwards the registration request to the OTAF 16. OTAF 16 recognizes that this mobile station has completed the transfer of billing information (based on step 504). The OTAF 16, in step 608, begins the download process by sending an interim OTAA request to the MSC 18. The request includes RANDS1, RANDS2, and authentication request number AUTHS received in step 504. MSC 18, in step 610, forwards the interim OTAA request to mobile station 20. The request is packaged as a carrier-specific teleservice.

Figure 7:
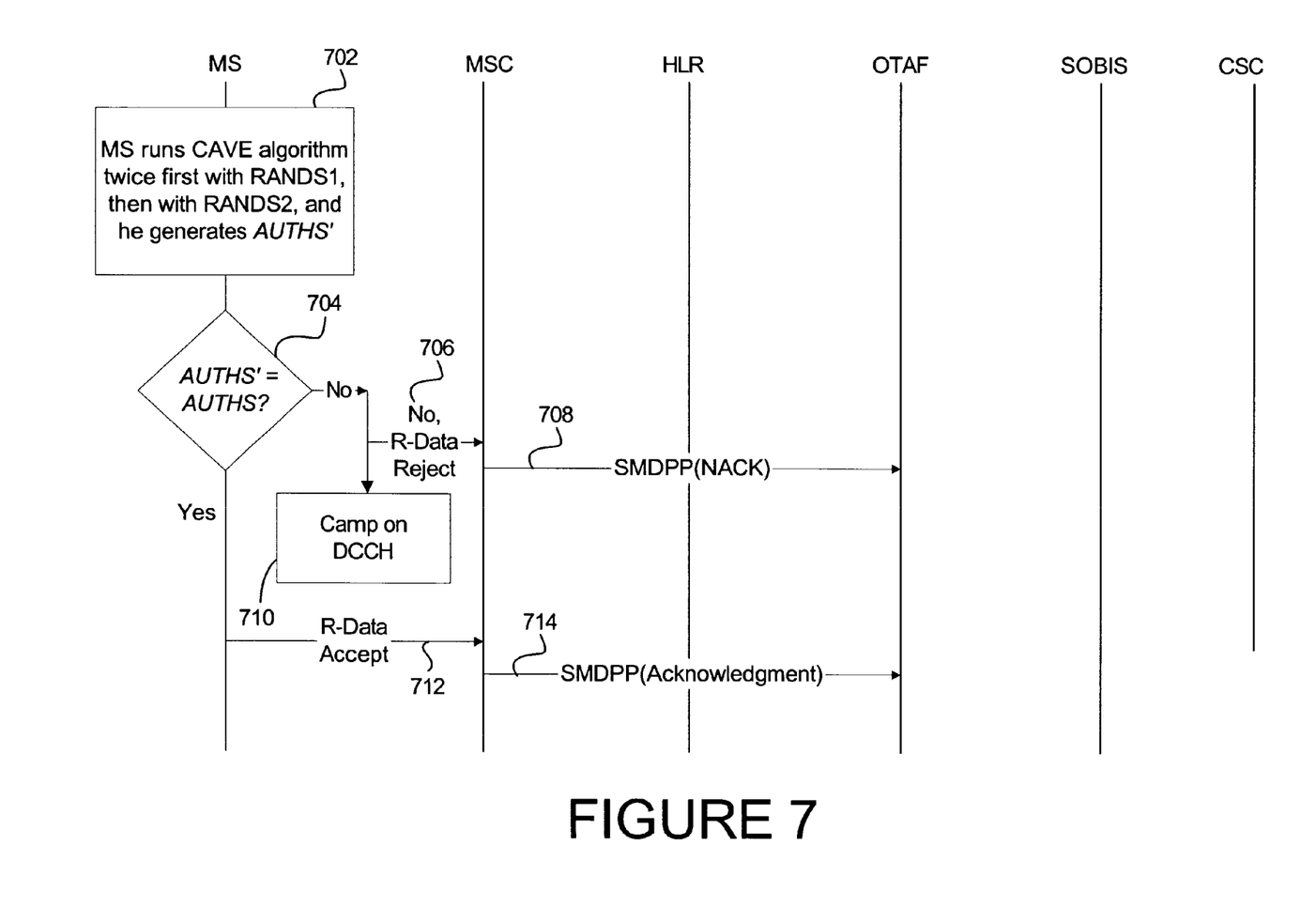
FIG. 7 is a call flow diagram illustrating the flow of information between network components in response to an interim over the air activation request.

FIG. 7 is a call flow diagram illustrating the flow of information between network components in response to an interim OTAA request. In step 702, cellular mobile station 20 runs the CAVE algorithm. The mobile station 20 inputs RANDS1 into the CAVE algorithm as part of the SSD generation routine, along with its preprogrammed A-key, and computes a temporary SSD. Next, the mobile station 20 uses the temporary SSD along with RANDS2 as inputs to the CAVE algorithm to compute AUTHS'. Mobile station 20 then compares AUTHS' to AUTHS as provided by the network. If AUTHS'=AUTHS, then the cellular mobile station 20 has verified that the network has knowledge of the pre-programmed A-key and, therefore, is the correct service provider. The mobile station 20, in step 712, sends a Data Accept message back to MSC 18. The MSC 18, in turn, sends an acknowledgment back to OTAF 16. If AUTHS'≠AUTHS, the mobile station 20, in step 706, sends a data reject message back to MSC 18. The mobile station 20 will then camp on DCCH for another authorization attempt in step 710.

Figure 8:
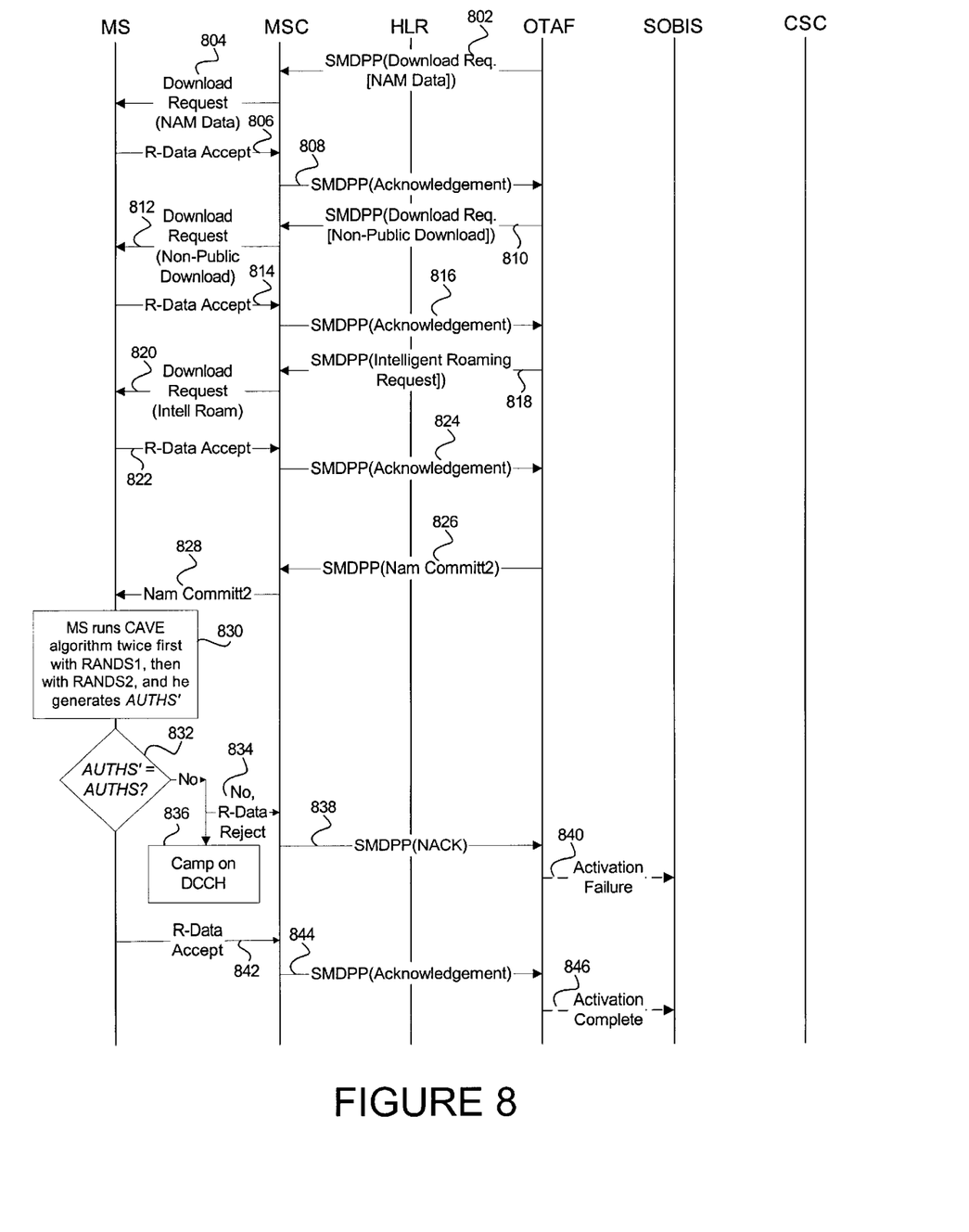
FIG. 8 is a call flow diagram illustrating the flow of information between network components during the downloading of messages.

FIG. 8 is a call flow diagram illustrating the flow of information between network components during the downloading of messages. In steps 802–804, OTAF 16 sends a request to download NAM data to MSC 18 that sends the same request to the mobile station 20. The mobile station 20, in step 806, sends a data accept message back to MSC 18. MSC 18 then sends an acknowledgment to OTAF 16. In steps 810–812, OTAF 16 and MSC 18 send a request to download non-public information to the mobile station 20. The mobile station 20, in step 814, accepts the data and MSC 18 sends an acknowledgment to OTAF 16. In steps 818–820, OTAF 16 and MSC 18 send an intelligent roaming request to mobile station 20. Mobile station 20, in step 822, accepts the data and MSC 18 sends an acknowledgment of the same to OTAF 16. In steps 826–828, OTAF 16 and MSC 18 send a NAM Commit 2 Request to mobile station 20 to reconfirm the proper service provider. In steps 830–844, OTAF 16, MSC 18, and mobile station 20 perform a NAM Commit 2 request. The NAM Commit 2 request is similar to the interim OTAA request of steps 702–714, as described above. If the service provider is not re-confirmed, OTAF sends an activation failure message to BC in step 840. If the service provider is re-confirmed, OTAF sends an activation complete message to BC in step 846.

Figure 9:
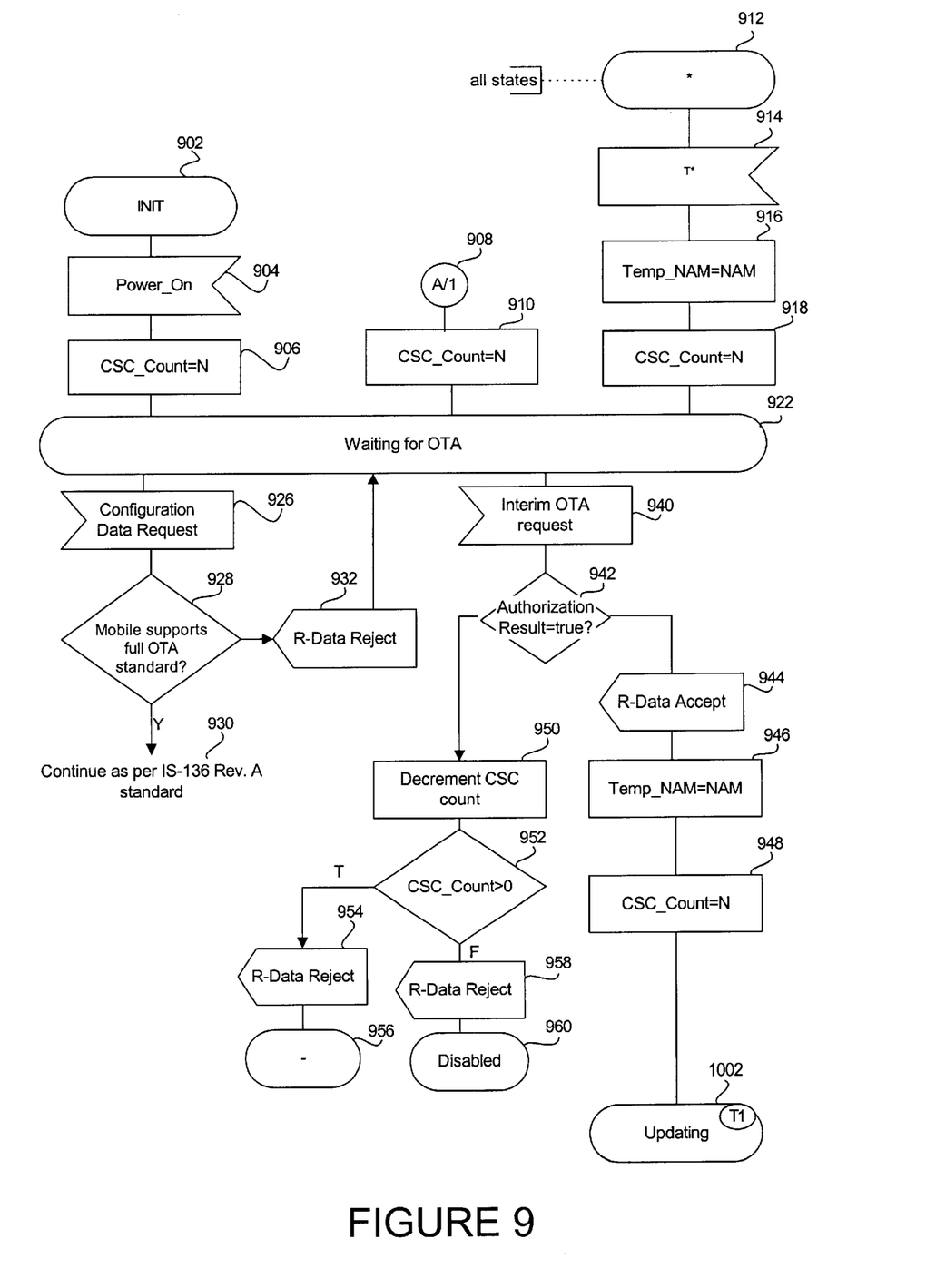
FIG. 9 is a Service Description Language diagram of cellular telephone unit 20 during over the air activation.

FIG. 9 is a Service Description Language ("SDL") diagram of cellular mobile station 20 during over the air activation. In step 902, mobile station 20 performs an initialization. Next, mobile station 20 performs a POWER_ON in step 904. In step 906, mobile station 20 sets variable CSC_Count=N, where N is the number of authorization attempts that may be made before the mobile station is disabled. Processing may also return to a beginning state at step 908 or step 912. In step 916, the variable TempNAM is set equal to NAM. CSC_Count is set equal to N. The mobile station 20 then waits for authorization in step 922.

In step 926, the mobile station receives a configuration data request. If the mobile station 20 supports full over the air authorization standards, the mobile station proceeds as described in IS-136 A. If the mobile station does not support the OTAA standards, the mobile station sends a data reject message and returns to step 922.

In step 940, the mobile station receives an interim OTAA request. In step 942, the mobile station determines whether the authorization result (AUTHS'=AUTHS) is true. If the authorization result is true, the mobile station sends a data accept message in step 944. The mobile station 20 then sets Temp_NAM=NAM. CSC_Count is set equal to N. Processing then continues at step 1002. If the authorization result is not true, the mobile station 20 decrements CSC_Count. If CSC_Count is greater than zero, the mobile station 20, in step 954, sends a data reject message and may wait for another attempt. If CSC_Count is not greater than zero, the unit sends a data reject message and disables itself.

Figure 10:
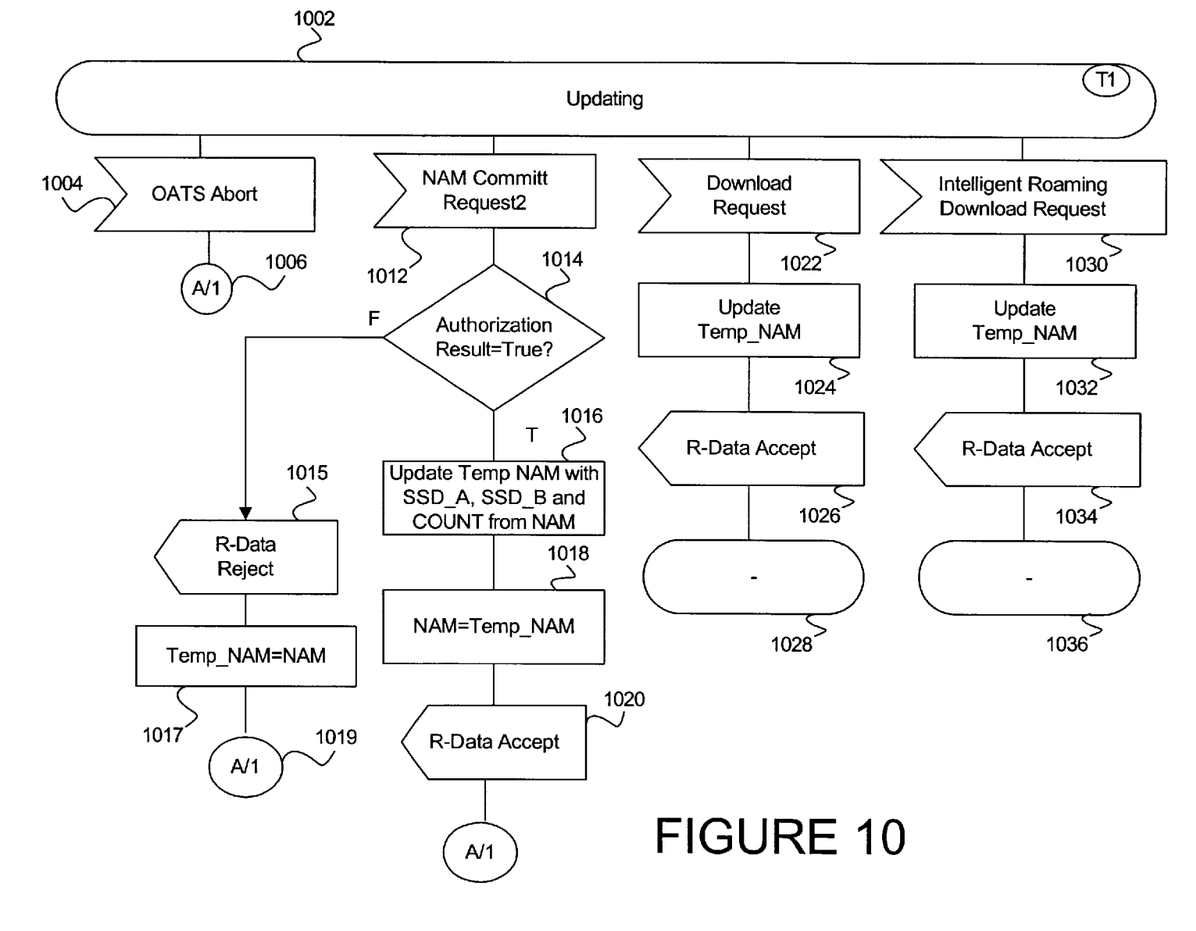
FIG. 10 is a Service Description Language diagram illustrating the updating of cellular telephone unit.

FIG. 10 is an SDL diagram illustrating the updating of mobile station 20. In step 1004, the unit 20 receives an over the air activation abort message. In step 1006, the mobile station goes to step 908. In step 1012, the unit receives the NAM Commit 2 Request. The mobile station 20, in step 1014, verifies that the authorization result is true (AUTHS'=AUTHS). If the result is true, the mobile station 20 updates Temp_NAM with SSD_A, SSD_B, and COUNT from NAM. In step 1018, NAM is set equal to Temp_NAM. In step 1020, the mobile station sends a data accept message and returns to step 908. If the authorization result is false, the mobile station 20, in step 1015 sends a data reject message. In step 1017, Temp_NAM is set equal to NAM.

In step 1022, the mobile station receives a download request. In step 1024, the mobile station 20 updates Temp_NAM as provided in the download request. In step 1026, the mobile station sends a data accept message. In step 1030, the mobile station receives the intelligent roaming download request. In step 1032, the mobile station 20 updates Temp_NAM as provided in the roaming download request. The mobile station, in step 1034, sends a data accept message.

Having thus described a preferred embodiment of a method and apparatus for performing network authentication during over the air activation, it should be apparent to those skilled in the art that certain advantages have been achieved. It should also be appreciated that various modifications, adaptations, and alternative embodiments thereof, may be made within the scope and spirit of the present invention.

The invention is further defined by the following claims:

1. A method for authenticating a service provider during over the air activation of a mobile station, the mobile station including an authentication key (A-key) value and the service provider including the A-key value, the method comprising:
   generating, at the service provider, a first authentication value using the A-key value;
   transmitting the first authentication value to the mobile station;
   generating, at the mobile station, a second authentication value using the A-key value; and
   comparing the first authentication value to the second authentication value at the mobile station.

2. The method for authenticating a service provider, as recited in claim 1, wherein generating the first authentication value further comprises performing a first CAVE algorithm.

3. The method for authenticating a service provider, as recited in claim 2, wherein generating the first authentication value further comprises performing a second CAVE algorithm.

4. The method for authenticating a service provider, as received in claim 3, wherein generating the second authentication value further comprises performing a third CAVE algorithm.

5. The method for authenticating a service provider, as recited in claim 4, wherein generating the second authentication value further comprises performing a fourth CAVE algorithm.

6. The method for authenticating a service provider, as recited in claim 1, wherein generating the first authentication value further comprises performing a first CAVE algorithm using a first random number and the A-key value, the first CAVE algorithm producing a first shared secret data value.

7. The method for authenticating a service provider, as recited in claim 6, wherein generating the first authentication value further comprises performing a second CAVE algorithm using a second random number and the first shared secret data value.

8. The method for authenticating a service provider, as recited in claim 7, further comprising transmitting the first random number and the second random number to the mobile station.

9. The method for authenticating a service provider, as recited in claim 8, wherein generating the second authentication value further comprises performing a third CAVE algorithm using the first random number and the A-key value, the third CAVE algorithm producing a second shared secret data value.

10. The method for authenticating a service provider, as recited in claim 9, wherein generating the second authentication value further comprises performing a fourth CAVE algorithm using the second random number and the second shared secret data value.

11. The method for authenticating a service provider, as recited in claim 1, further comprising
   sending a registration request from the mobile station to the service provider.

12. A method for authenticating a service provider during over the air activation of a mobile station within a network, the mobile station including an authentication key (A-key) and the service provider including the A-key, the method comprising:
   generating, at the service provider, a first random number and a second random number;
   performing, at the service provider, a first CAVE algorithm using the first random number and the A-key, the first CAVE algorithm producing a first shared secret data value;
   performing, at the service provider, a second CAVE algorithm using the second random number and the first shared secret data value, the second CAVE algorithm producing a first authentication value;
   transmitting the first random number, the second random number, and the first authentication value to the mobile station;
   performing, at the mobile station, a third CAVE algorithm using the first random number and the A-key, the third CAVE algorithm producing a second shared secret data value;
   performing, at the mobile station, a fourth CAVE algorithm using the second random number and the second shared secret data value, the fourth CAVE algorithm producing a second authentication value; and
   comparing the first authentication value to the second authentication value.

13. The method for authenticating a service provider, as recited in claim 12, further comprising transmitting a registration request from the mobile station to the service provider.

14. An apparatus for authenticating a service provider during over the air activation of a mobile station, the mobile station including an authentication key (A-key value) and the service provider including the A-key value, the apparatus comprising:

means for generating, at the service provider, a first authentication value using the A-key value;

means for transmitting the first authentication value to the mobile station;

means for generating, at the mobile station, a second authentication value using the A-key value; and     means for comparing the first authentication value to the second authentication value at the mobile station.

15. The apparatus for authenticating a service provider, as recited in claim 14, wherein the means for generating the first authentication value further comprises:

means for performing a first CAVE algorithm using the A-key value and a first random number, the first CAVE algorithm producing a first shared secret data value; and     means for performing a second CAVE algorithm using a second random number and the first shared secret data value.

16. The apparatus for authenticating a service provider, as recited in claim 15, further comprising means for transmitting the first random number and the second random number to the mobile station.

17. The apparatus for authenticating a service provider, as recited in claim 16, wherein the means for generating the second authentication value further comprises:

means for performing a third CAVE algorithm using the A-key value and the first random number, the third CAVE algorithm producing a second shared secret data value; and     means for performing a fourth CAVE algorithm using the second random number and the second shared secret data value.

18. The apparatus for authenticating a service provider, as recited in claim 14, further comprising means for transmitting a registration request from the mobile station to the service provider.

19. The apparatus for authenticating a service provider, as recited in claim 18, further comprising means for transmitting billing information from the mobile station to the service provider.

20. An apparatus for authenticating a service provider during over the air activation of a mobile station within a network, the mobile station including an authentication key (A-key) and the service provider including the A-key the apparatus comprising:

means for generating, at the service provider, a first random number and a second random number;

means for performing, at the service provider, a first CAVE algorithm using the first random number and the A-key, the first CAVE algorithm producing a first shared secret data value;

means for performing, at the service provider, a second CAVE algorithm using the second random number and the first shared secret data value, the second CAVE algorithm producing a first authentication value;

means for transmitting the first random number, the second random number, and the first authentication value to the mobile station;

means for performing, at the mobile station, a third CAVE algorithm using the first random number and the A-key, the third CAVE algorithm producing a second shared secret data value;

means for performing, at the mobile station, a fourth CAVE algorithm using the second random number and the second shared secret data value, the fourth CAVE algorithm producing a second authentication value; and     means for comparing the first authentication value to the second authentication value.

21. A method for authenticating a service provider during over the air activation of a mobile station, the mobile station being programmed with an A-key value, the method comprising:

detecting an attempt at over the air activation of the mobile station, the attempt resulting in receipt of a first authentication value from a service provider;

in response to receipt of the first authentication value, generating a second authentication value using the A-key value;

determining the first authentication value to be a match to the second authentication value at the mobile station; and     in response to the match, finding the service provider to be authentic at the mobile station and allowing the over the air activation of the mobile station by the service provider.

22. The method for authenticating the service provider, as recited in claim 21, wherein the match comprises the first authentication value being equal to the second authentication value.

23. The method for authenticating the service provider, as recited in claim 21, wherein the attempt at the over the air activation of the mobile station results in receipt of the first authentication value, a first random number, and a second random number;

wherein the step of generating the second authentication value using the A-key value comprises         performing a CAVE algorithm using the first random number and the A-key value, the CAVE algorithm producing a shared secret data value, and         performing another CAVE algorithm using the shared secret data value and the second random number, the another CAVE algorithm producing the second authentication value.

24. The method of claim 1 or claim 12, further comprising:

if the comparison of the first authentication value to the second authentication value results in a match, then determining the service provider to be an authenticated service provider for the over the air activation of the mobile station.

25. The apparatus of claim 14 or claim 20, further comprising a means for determining the first authentication value matches the second authentication value, and therefore, the service provider is an authenticated service provider for the over the air activation of the mobile station.

26. A mobile station programmed with an authentication key (A-key) and operative to authenticate a service provider for over the air activation of the mobile station, the mobile station comprising:

means for receiving a first authentication value from the service provider;

means for generating a second authentication value using the A-key value in response to receipt of the first authentication value; and     means for determining the first authentication value to match the second authentication value at the mobile station, the match indicating the service provider to be authentic, whereby the mobile station may allow over the air activation by the service provider as a result of the determination of the authenticity of the service provider based on the match of the first authentication value, received from the service provider, and the second authentication value, generated by the mobile station using the A-key.

27. The mobile station of claim 26, wherein the means for receiving comprises means for receiving the first authentication value, a first random number, and a second random number from the service provider;

wherein the means for generating comprises means for generating the second authentication value by performing a CAVE algorithm using the first random number and the A-key value to produce a shared secret data value, and performing another CAVE algorithm using the shared secret data value and the second random number to produce the second authentication number.

\* \* \* \* \*